United States Patent
Love et al.

(10) Patent No.: US 10,319,395 B2
(45) Date of Patent: Jun. 11, 2019

(54) SYSTEM AND METHOD FOR PREDICTIVE GENERATION OF VISUAL SEQUENCES

(71) Applicant: LIMBIC MEDIA CORPORATION, Victoria (CA)

(72) Inventors: Justin Thomas Love, Victoria (CA); Manjinder Singh Benning, Victoria (CA); Adam Elliot, Victoria (CA); Jakob Leben, Victoria (CA); Gabrielle Odowichuk, Vancouver (CA)

(73) Assignee: LIMBIC MEDIA CORPORATION, Victoria (CA)

( * ) Notice: Subject to any disclaimer, the term of this patent is extended or adjusted under 35 U.S.C. 154(b) by 148 days.

(21) Appl. No.: 15/457,758

(22) Filed: Mar. 13, 2017

(65) Prior Publication Data
US 2018/0061438 A1    Mar. 1, 2018

Related U.S. Application Data (60) Provisional application No. 62/307,311, filed on Mar. 11, 2016.

(51) Int. Cl.
| | |
|---|---|
| *G06F 17/00* | (2019.01) |
| *G10L 21/10* | (2013.01) |
| *H05B 37/02* | (2006.01) |
| *G06F 3/16* | (2006.01) |
| *G10L 25/18* | (2013.01) |

(Continued)

(52) U.S. Cl.
CPC .............. *G10L 21/10* (2013.01); *G06F 3/16* (2013.01); *H05B 37/029* (2013.01); *H05B 37/0236* (2013.01); *G10L 25/18* (2013.01); *G10L 25/51* (2013.01); *G10L 25/90* (2013.01)

(58) Field of Classification Search
CPC ......... G10L 21/10; G10L 25/18; G10L 25/51; G06F 3/16; H05B 37/0236; H05B 37/029
See application file for complete search history.

(56) References Cited

U.S. PATENT DOCUMENTS

| | | |
|---|---|---|
| 1,946,026 A | 2/1934 | Thomas et al. |
| 3,635,121 A | 1/1972 | Knauff |

(Continued)

FOREIGN PATENT DOCUMENTS

| | | |
|---|---|---|
| WO | 2005084477 | 9/2005 |
| WO | 2008059445 | 5/2008 |

(Continued)

OTHER PUBLICATIONS

Colizoli O., J. M. J. Murre and R. Rouw; Pseudo-Synesthesia through Reading Books with Colored Letters; PLoS One 2012 7(6);e39799.

(Continued)

*Primary Examiner* — Fan S Tsang
*Assistant Examiner* — David Siegel
(74) *Attorney, Agent, or Firm* — Damien G. Loveland (57) ABSTRACT

A system and method for predictively generating visual experiences based on streaming audio is disclosed. More specifically, the present invention is directed to systems and apparatus for analyzing streaming audio and predictively mapping the information in the stream to a sequence of visual patterns generated by a lighting system in a manner that induces a perceptual association between the streaming audio and visual patterns.

17 Claims, 4 Drawing Sheets

(51) Int. Cl.
*G10L 25/51* (2013.01)
*G10L 25/90* (2013.01)

(56) References Cited

U.S. PATENT DOCUMENTS

| | | | |
|---|---|---|---|
| 4,376,404 A * | 3/1983 | Haddad | A63J 17/00 137/624.11 |
| 5,056,399 A | 10/1991 | Hornstein | |
| 5,818,342 A | 10/1998 | Solomon et al. | |
| 6,166,496 A | 12/2000 | Lys et al. | |
| 6,395,969 B1 | 5/2002 | Fuhrer | |
| 7,031,920 B2 | 4/2006 | Dowling et al. | |
| 7,228,190 B2 | 6/2007 | Dowling et al. | |
| 7,489,089 B2 | 2/2009 | Gandhi | |
| 8,461,443 B2 | 6/2013 | McKinney et al. | |
| 8,514,097 B2 | 8/2013 | Boise | |
| 8,849,407 B1 | 9/2014 | Danilov et al. | |
| 9,699,867 B2 | 7/2017 | Horist | |
| 2002/0038157 A1 | 3/2002 | Dowling et al. | |
| 2010/0071535 A1 * | 3/2010 | McKinney | H05B 37/0236 84/464 R |
| 2012/0025717 A1 | 2/2012 | Klusmann et al. | |
| 2016/0128167 A1 * | 5/2016 | Sun | H05B 37/0272 315/297 |

FOREIGN PATENT DOCUMENTS

| | | |
|---|---|---|
| WO | 2012090142 | 11/2012 |
| WO | 2014204916 | 12/2014 |

OTHER PUBLICATIONS

Fassridge C., C. C. Marcotti, and E. Freeman; A Deafening Flash! Visual Interference of Auditory Signal Detection; Consciousness and Cognition 2017 49:15-24.
Karwoski, T. F., and H. S. Odbert; Color-music; Psychological Monographs 1938 50(2):1-60.
Suslick K. S.; Synesthesia in Science and Technology: More than Making the Unseen Visible; Current Opinion in Chemical Biology 2012 16:557-563.

* cited by examiner

SYSTEM AND METHOD FOR PREDICTIVE GENERATION OF VISUAL SEQUENCES

CROSS-REFERENCE TO RELATED APPLICATIONS

This application claims the benefit of U.S. provisional patent application Ser. No. 62/307,311, filed on Mar. 11, 2016, which is incorporated by reference herein in its entirety.

TECHNICAL FIELD

The subject matter of the present invention relates to an audio-visual entertainment systems wherein the visual sequences are perceptually associated with the streaming audio.

BACKGROUND

Audio-visual entertainment systems wherein an audio signal is combined with illumination control signal to simultaneously control audio and lighting equipment are well known. For example, U.S. Pat. No. 6,166,496 discloses a system and method wherein audio and/or video signals are combined with an illumination control signal that is subsequently decoded into constituent signals that are delivered to an entertainment device such as, for example, a video- and/or audio-capable device, and to a controllable illumination source such as, for example, a light-emitting diode (LED) system whose controller dynamically varies the color and intensity of the LEDs in response to the illumination control signal.

Those with knowledge of the field will recognize U.S. Pat. No. 6,166,496 as being related to much earlier "light organs," An early example is U.S. Pat. No. 1,946,026, wherein the intensity of colored lights was determined by mechanical devices responsive to sounds of different frequencies. A later example, U.S. Pat. No. 3,635,121, employed electrical resonant circuits to respond to low, medium and high audio frequencies by flashing colored lights.

What these and other examples of prior art do not consider, however, is why humans tend to associate certain colors and dynamic color patterns with different genres of music and speech styles. Without such an understanding, the illumination control signal must be either generated in advance as an artistic expression by a human operator and synchronized with the playback of the audio signal, or by simply responding to different frequency ranges within the audio signal as it is received.

Recent research suggests, however, an explanation for our tendency and preference to associate certain colors and dynamic color patterns (especially light sources with constantly changing colors and intensities) with different genres of music and speech styles: synesthesia.

Synesthesia is a neurological condition wherein the stimulation of one sensory or cognitive pathway results in the person experiencing automatic and involuntary responses from a second sensory or cognitive pathway. Persons with this neurological condition are referred to as "synesthetes."

Somewhat surprisingly, many synesthetes do not consider their condition as a handicap, and even as a gift. Synesthetes have reported that they have used their abilities as an aid to memorization, mental arithmetic, and complex creative activities such as producing visual art, music, and theater.

Synesthesia is also surprisingly common. In a recent study (Fassridge et al. 2017) of neurotypical adult participants, 22 percent of subjects reported that they heard faint sounds accompanying silent visual flashes, an example of visual-auditory synthesia. This suggests that synesthesia is not a rare and abnormal condition, but rather a matter of degree. In a much earlier study (Karwoski et al. 1938) of 274 adult participants, 60 percent exhibited "chromesthesia," which is the association of musical passages with various colors.

A recent survey (Suslick 2012) noted that many scientists, technologists, and inventors have developed artificial forms of synesthesia as a means of helping people sense their environments. As one example, the BrainPort V100 oral electronic vision aid, manufactured by Wicab, Inc. of Middleton, Wis., is a battery-operated device that includes a digital camera mounted on a pair of glasses and a small, flat intra-oral device containing a series of electrodes that the user holds against their tongue (U.S. Pat. No. 8,849,407). Software converts the image captured by the camera into electrical signals that as perceived as vibrations or tingling on the user's tongue. With training and experience, the user learns to interpret the signals to interpret the location, position, size, and shape of objects, and to determine if the objects are stationary or moving.

Another recent study (Colizoli et al. 2012) demonstrated that non-synesthetes are capable of acquiring synesthetic behavioral traits in adulthood through training. This reinforces the view that synesthesia is not a rare neurological aberration, but an inherent capability that can be learned through practice.

It is therefore evident that music aficionados may better appreciate music that they are listening to if it is accompanied by a dynamic display of visual colors and patterns that chromesthesic synesthetes may experience when listening to the same music. In accordance with the study of Colizoli et al. (2012), it is further evident that music aficionados may be able to learn chromesthesic responses to music passages through practice, to the extent where they may consciously experience visual colors and patterns in response to music without external visual stimuli.

It is further evident from the aforementioned studies that individual listeners may experience different color associations when listening to passages of music. These preferences may be consciously expressed, or they may be subconsciously experienced. There is therefore a need for a system and method wherein music passages and speech patterns are automatically mapped into a visual display of colors and patterns, and wherein the system learns the listener's preferences and adapts its auditory-to-visual mapping accordingly.

This background information is provided to reveal information believed by the applicant to be of possible relevance to the present invention. No admission is necessarily intended, nor should be construed, that any of the preceding information constitutes prior art against the present invention.

SUMMARY OF INVENTION

The present invention comprises an audio-visual control system that receives a streaming audio signals and outputs both a real-time audio signal and a lighting system control signal. Integral to the audio-visual control system is a digital buffer that stores the audio signal as it is being streamed.

The audio-visual control system continually monitors the contents of the digital buffer while performing various mathematical operations on the audio signal stored therein. Said operations include audio frequency and envelope analysis, followed by linear and/or non-linear mapping of the analysis results to a real-time lighting system control signal. This mapping is computed based on the contents of the audio buffer rather than the real-time audio signal, and so it can be seen to be a predictive mapping.

The lighting system control signal is comprised of one or a plurality of lighting control channels, wherein each channel controls the color and/or intensity of one or a plurality of light sources.

The audio-visual control system may also receive digital signals from external sources representing discrete events, which may be combined with the audio frequency and envelope analysis when performing the mapping of the analysis results to a real-time lighting system control signal.

The audio-visual control system may further include a database of previously processed audio signals wherein the signals are symbolically represented by their audio frequency and envelope analysis results, along with their precalculated mappings. As the system processes the current streaming audio signal, it may search the database for approximate matches and employ the corresponding mapping as a template for mapping the current signal.

The audio-visual control system may further include an artificial intelligence component, such as for example a neural network, that can autonomously learn or be trained to classify music genres and patterns, and/or to recognize speech styles and patterns. Upon receipt of a streaming audio signal and its frequency and envelope analysis, the neural network can map or assist in mapping the real-time audio signal to a real-time lighting system control signal.

Disclosed herein is a method for controlling one or more light sources, comprising: receiving, in a buffer, a streaming audio signal; receiving, from the buffer, a buffer contents signal representing at least a portion of the streaming audio signal in the buffer; analyzing the buffer contents signal; generating a lighting control signal based on said analysis; outputting a real-time audio signal from the buffer; and outputting the lighting control signal in synchronization with the real-time audio signal.

In some embodiments, the real-time audio signal comprises an impulsive sound feature having a first duration; and the generating comprises generating a corresponding feature in the lighting control signal having a second duration that is longer than the first duration, thereby adapting a part of the lighting control signal corresponding to the impulsive sound feature to a human's visual response time.

In some embodiments, the second duration is three orders of magnitude longer than the first duration. In some embodiments, the analysis determines whether the streaming audio signal includes an instance of a human voice. In some embodiments, the analysis determines whether the streaming audio signal includes music.

In some embodiments, the method comprises storing pre-analyzed audio signals and their corresponding lighting control signals in a database, wherein the analyzing step comprises: identifying, in the database, an approximate match for said portion of the streaming audio signal; retrieving, from the database, the corresponding lighting control signal for said match; and basing the output lighting control signal on the retrieved corresponding lighting control signal.

In some embodiments, the method further comprises storing previously analyzed audio signals and their corresponding lighting control signals in a database, in a format representing a light show; and retrieving the stored signals to perform the light show.

In some embodiments, the analysis further comprises: detection and classification of music genre or music pattern based on one or more initial bars of a track in the streaming audio signal; and retrieval of a lighting control signal corresponding to the classification from a database.

In some embodiments, the method further comprises: analyzing an upcoming portion of a track, a whole track, or a playlist in the buffer contents signal; planning a light show based on said retrieved upcoming portion of a track, a whole track, or a playlist; and maintaining continuity of the light show between successive tracks, based on said retrieved upcoming portion of a track, a whole track, or a playlist.

In some embodiments, the method further comprises: analyzing a past portion of a track or whole track received in the buffer; and maintaining continuity of a light show between successive tracks, based on said past portion of a track or whole track received in the buffer.

In some embodiments, the method further comprises: detecting a frequency range of the buffer contents signal; and dividing the buffer contents signal into sub-octave bins spanning the frequency range; wherein generating the lighting control signal is based on a content of each said bin.

In some embodiments, the lighting control signal includes a specification of color and a specification of brightness for at least one light source. In some embodiments, the lighting control signal includes a specification of color and a specification of brightness for each of a plurality of light sources based on a physical location of each of the light sources.

In some embodiments, the lighting control signal is based on one or more of: frequency analysis; detection and classification of a percussive sound; detection of a melodic sound; strength of a melodic sound; a further received signal; a musical key; rhythmic dissonance; harmonic dissonance; tempo detection; beat detection; beat strength estimation; song transition; inter-song transition; a non-musical event; artificial intelligence; an interaction of multiple intelligent agents; an introduction of random colors; meta data of the streaming audio signal; an audience response; a sound envelope; maximizing a response of a lighting display system in relation to the real-time audio signal; varying a frequency range of a sub-octave bin used in said analysis; detection and classification of music genre or music pattern; detection and classification of speech style or pattern; a linear mapping of a sound feature in the streamed audio signal to the lighting control signal; and a non-linear mapping of a sound feature in the streamed audio signal to the lighting control signal.

Further disclosed herein is a system for controlling one or more light sources, comprising: a buffer configured to receive a streaming audio signal; and output a real-time audio signal; and a predictive mapping unit configured to: receive, from the buffer, a buffer contents signal representing at least a portion of the streaming audio signal in the buffer; analyze the buffer contents signal; generate a lighting control signal based on said analysis; and output the lighting control signal in synchronization with the real-time audio signal.

In some embodiments, the real-time audio signal comprises an impulsive sound feature having a first duration; and the predictive mapping unit is configured to output a feature in the lighting control signal corresponding to the impulsive sound feature and having a second duration that is longer than the first duration, thereby adapting the lighting control signal corresponding to the impulsive sound feature to a human's visual response time.

In some embodiments, the predictive mapping unit further comprises: a frequency analyzer that receives the buffer contents signal and outputs a frequency domain signal; and a binning module that receives the frequency domain signal and outputs a plurality of sub-octave bin signals.

In some embodiments, the predictive mapping unit further comprises: a temporal filter that outputs an envelope analysis signal; a feature extractor that is configured to detect one or more of genre; musical key; rhythmic dissonance; harmonic dissonance; tempo; beat; beat strength; song transition; inter-song transition; melody; melody strength; and percussive elements; and to output a corresponding feature signal; and a non-music detector configured to detect one or more of speech; a whistle; a yell; clapping; singing; wind; and rain; and to output a non-musical event signal.

In some embodiments, the predictive mapping unit further comprises a color space mapper configured to map the lighting control signal through a subset of color space that is delimited by chromaticities and maximum spectral radiant intensities of one or more light sources to which the lighting control signal is output.

BRIEF DESCRIPTION OF DRAWINGS

The following drawings illustrate embodiments of the invention, which should not be construed as restricting the scope of the invention in any way.

DESCRIPTION

Glossary

The term "streaming audio" is herein defined as a digital audio signal that is intermittently or continuously received from one or a plurality of external sources, such as for example a microphone, an audio mixer, wireless audio, a local area network, or the Internet, and which is buffered while the real-time audio signal is being played. The real-time audio signal may be comprised of one or a multiplicity of audio channels, such as for example a stereo signal or a 5-channel surround sound signal.

The term "real-time audio signal" refers to an audio signal that is output from a buffer and input to an audio playback system.

The term "module" can refer to any component in this invention and to any or all of the features of the invention without limitation. A module may be a software, firmware or hardware module, or any combination thereof, and may include one or more processors, discrete electronic components, integrated electronic components and/or non-transient computer readable memory storing instructions and data that are executed and read by the processor(s).

Exemplary Embodiment

Figure 1:
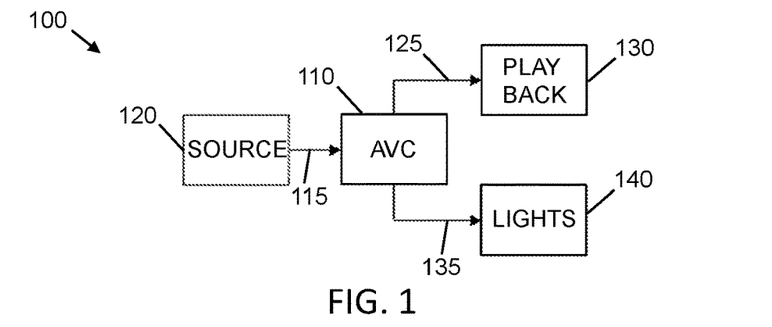
FIG. 1 illustrates an audio-visual control system comprised of a streaming audio source, an audio-visual controller (AVC), an audio playback system, and a lighting display system.

Referring to FIG. 1, the audio-visual control system 100 is comprised of an audio-visual controller (AVC) 110 that receives streaming audio signal 115 from a source 120 and outputs one or a multiplicity of real-time audio signals 125 to an audio playback system 130, and one or a multiplicity of illumination or lighting control signals 135 to a lighting display system 140. The streaming audio signal 115 may be transmitted via a local area network, an Internet connection, or other digital data source.

Figure 2:
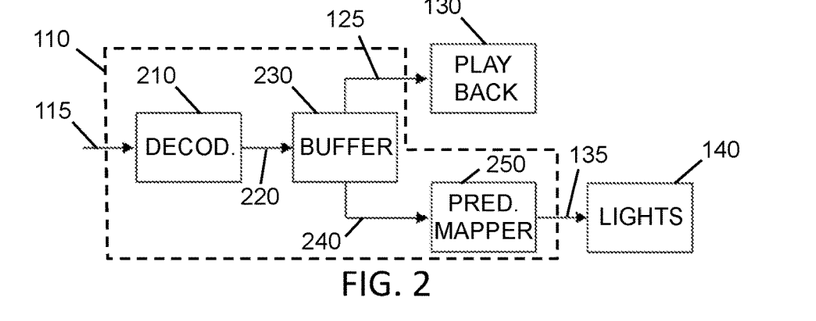
FIG. 2 illustrates audio-visual controller comprised of a streaming audio decoder, a digital audio buffer, an audio playback system, a predictive audio signal mapping unit, and a lighting display system.

Referring to FIG. 2, the audio-visual controller (AVC) 110 is comprised of a channel separator or decoder 210 that decodes the streaming audio signal 115 and outputs one or a multiplicity of decoded audio signals 220 to digital audio buffers 230. Each digital buffer then outputs a per-channel real-time audio signal 125 to audio playback system 130. Each digital buffer also outputs buffer content signals 240 to one or a multiplicity of predictive audio signal mapping units 250, which output a per-channel lighting control signal 135 to lighting display system 140.

Figure 3:
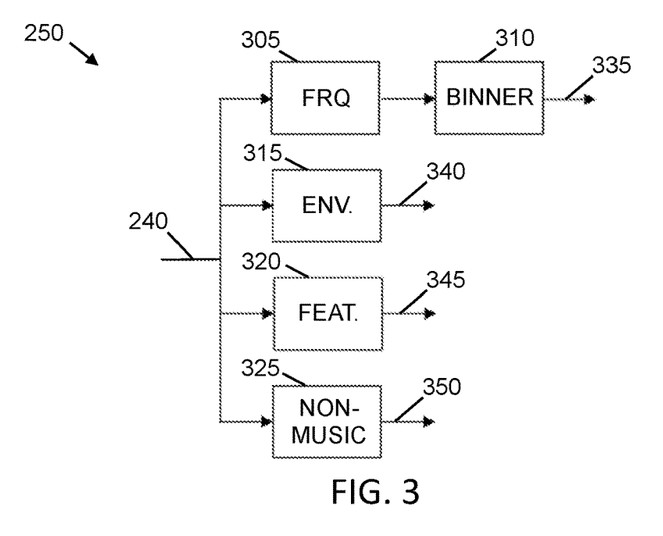
FIG. 3 illustrates a predictive audio signal mapping unit comprised of a frequency analysis module, a sub-octave binning module, an audio envelope analysis module, a feature extraction module and a non-music event detection module.

Referring to FIG. 3, the predictive audio signal mapping unit 250 is comprised of a frequency analysis module 305, a sub-octave binning module 310, an audio envelope analysis module 315, a music feature extraction module 320, and a non-musical event detection unit 325.

Frequency analysis module 305 receives buffer content signal 240 and converts the time-domain signal into the frequency domain using, for example, a Fast Fourier Transform (FFT), a Fast Hadamard Transform (FHT), a Fast Wavelet Transform (FWT), a Discrete Hartley Transform (DHT), or similar suitable discrete transformation. The output of frequency module 305 is then received by sub-octave binning module 310, which bins the frequency-domain signal according a predetermined number of frequency ranges. Module 310 then outputs a multiplicity of sub-octave bin signals 335, whose amplitudes are proportional to the sum of the amplitudes of the frequency-domain signals for each bin.

In one embodiment, adaptive gain control may be applied to the sub-octave bin signals 335 in order to maximize variance of the ensemble of sub-octave bin amplitudes. This variance is propagated through the remainder of the audio-visual controller 110 to maximize the response of the light display system 140 to the real-time audio output by playback device 130.

In another embodiment, audio features such as, but not limited to, root-mean-square (RMS) amplitude, zero-crossing, spectral centroid, and spectral rolloff may be extracted from the sub-octave bin signals or directly from the output of the frequency analysis module.

In another embodiment, the sub-octave bin signals may be compared to determine whether a transient sound (such as a percussive sound) or a melodic sound (such as a wind instrument) is present in the audio signal. A transient sound, for example, would be represented by many sub-octave bin signals, while a melodic sound would be represented by harmonically-related sub-octave bin signals.

Figure 4:
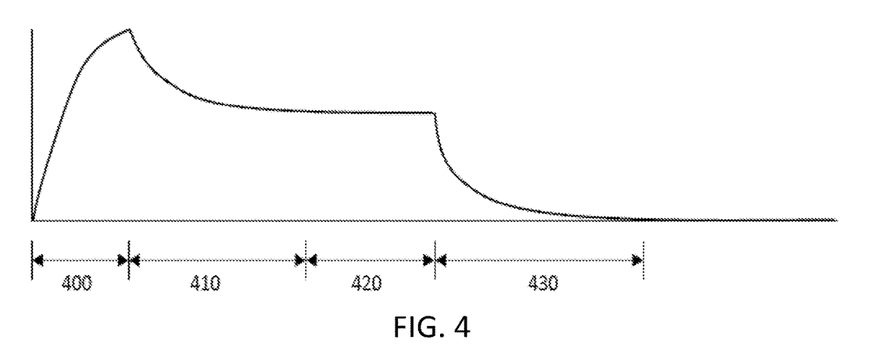
FIG. 4 illustrates a typical audio envelope for a musical note or chord.

Referring to FIG. 4, the term "audio envelope" is herein defined as the peak-to-peak amplitude of a real-time audio signal over a period of time. In the context of a musical note or chord, it includes the "attack," the "decay," the "sustain," and the "release." The attack 400 is the time it takes for the signal to reach the maximum level, the decay 410 is the time it takes for the signal level to go from the maximum level to the sustain level while the note or chord is held, the sustain 420 is the time the signal exhibits constant level while the note or chord is held, and the release 430 is the time it takes for the signal level to reach zero.

Referring again to FIG. 3, buffer contents signal 240 is also received by audio envelope analysis module 315 (aka a "temporal filter"), which identifies and quantifies attack, decay, sustain, and release features in the time domain. The module then outputs envelope analysis signal 340, which may include, but is not limited to, the instantaneous envelope amplitude and symbolic representations of the signal attack, decay, sustain, and release features.

Buffer contents signal 240 is also received by music feature extraction module 320, which performs the functions of: 1) genre recognition; 2) musical key detection; 3) rhythmic and harmonic dissonance measurement; 4) tempo detection and beat mapping; 5) song transition; 6) inter-song transition; 7) beat detection and strength estimation; 8) melody detection and strength; and 9) percussive element detection and classification, for example snare drum, bass drum, HH (Hi-hat) cymbals. This module outputs signal 345.

Genre detection may be performed by a machine learning algorithm. It may be used to dynamically influence subsequent operational parameters of the lighting display system.

Musical key detection may be used to dynamically influence subsequent operational parameters of the lighting display system. For example, a song in a minor key can inform a darker and more subdued color palette. Further, a key change can be used an event to trigger significant changes in the dynamic lighting display.

Rhythmic and harmonic dissonance can be measured in both the harmony and rhythm of a musical selection. Pop music is known for having very low dissonance while genres like jazz use higher levels of dissonance. A measure of dissonance for both harmony and rhythm can be used to inform parameters in the light program in many ways. For example, higher levels of aural dissonance can be programmed as dissonant colours in the lighting display.

Beat mapping gives phase alignment information on the quarter note down beats of the currently playing musical bar. Both tempo and beat mapping can inform certain parameters of the light programmer. For example, the lighting display can pulse in synced tempo and phase to the kick drum of an electronic dance song.

Detected song transitions or detected inter-song transitions can be used, for example, to change dynamic lighting display patterns or introduce salient lighting defects upon transition. Song transitions include transitions between songs, keys or movements. Inter-song transitions include transitions within a song, key or movement, and may include a chorus or verse within a song.

Beat detection can determine whether any percussive elements are present in the audio, and if so output a binary signal. The binary beat signal, with or without the beat strength estimate, can be used to inform the lighting display. For example, the beat strength can be used as an input to control the number of spawned agents in the agent-based model approach to color mapping disclosed herein.

Melody detection can determine whether any melodic elements are present in the audio, and if so output a binary signal. The binary melodic signal, with or without the melodic strength estimate, can be used to inform the lighting display. For example, the melodic strength can be used as an input to the color mapping module disclosed herein.

Percussion detection may be performed by a machine learning algorithm. It may be used to dynamically influence subsequent operational parameters of the lighting display system. For example, musical sections with a bass drum beat may result in a different color theme versus those sections without such a beat.

Voice includes sound or sounds uttered by living creatures, while human voice includes sound or sounds uttered by humans and may include one or more of speech, whistles, yells, or singing.

Buffer contents signal 240 is also received by non-music event detection module 325, which detects and classifies: 1) speech; 2) whistles; 3) yells; 4) clapping; 5) singing, 6) wind; and 7) rain. This module outputs signal 350.

Detected speech may be classified by means of a binary signal, with or without an accompanying representation of the speech frequency, may be used to dynamically influence subsequent operational parameters of the lighting display system. Similarly, whistles, yells, and clapping may be used to dynamically influence subsequent operational parameters of the lighting display system.

The presence of wind and rain may be detected and their strength measured to dynamically influence subsequent operational parameters of the lighting display system.

Figure 5:
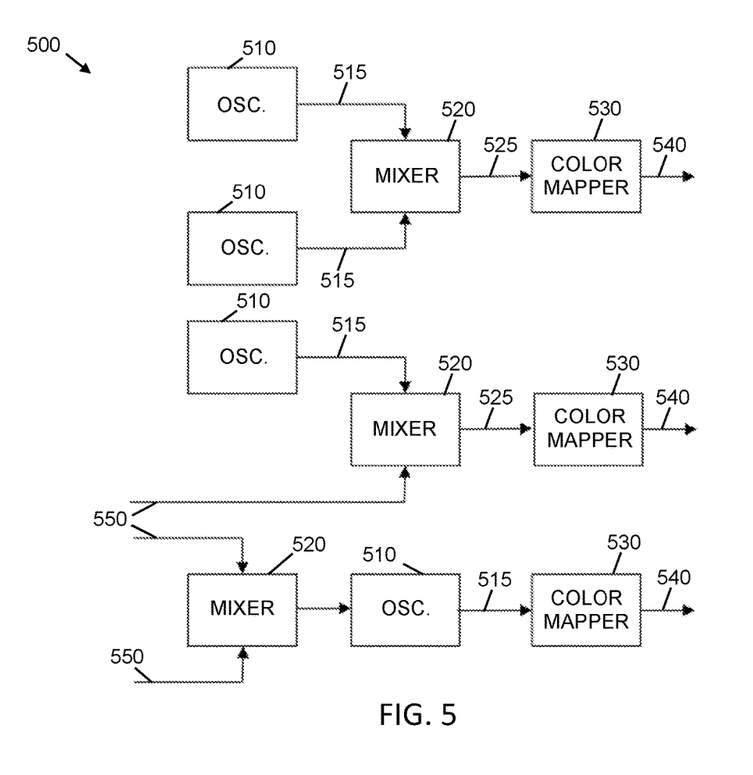
FIG. 5 illustrates an audio mapping unit comprised of low-frequency oscillators, signal mixing units, and color space mapping units.

Referring to FIG. 5, an audio signal mapping unit 500 is comprised of one or a plurality of low-frequency oscillators 510, one or a plurality of signal mixer units 520, and one or a plurality of color space mapping units 530. The audio signal mapping unit 500 may also function as, or be part of, the predictive audio signal mapping unit 250.

Each oscillator 510 has a preferred frequency range of zero to approximately 10 Hertz, although it may have a higher maximum frequency. The periodic oscillator output waveform may be sinusoidal, trapezoidal, binary, or any other shape.

The oscillator frequency may be fixed, periodically varying, or vary in a pseudorandom manner. It may also vary in response to (that is, be modulated by) one or a plurality of input signals 550, which may be a real-time audio signal, a sub-octave bin amplitude signal, an audio envelope amplitude signal, a symbolic representation of a signal attack, decay, sustain, or release feature, data or metadata from a cloud-based server, or an arbitrary digital or analog signal from an external source.

As an example of metadata received from a cloud-based server via input signal 550, this may include information related, but not limited to, the emotional mood of the music, color themes derived from album art, country of origin, play statistics, sponsored advertiser content, weather information, stock information, current news events, real-time pedestrian statistics, and social information keywords and hashtags.

The oscillator output signal 515 amplitude may further vary in response to (that is, be modulated by) one of a plurality of input signals 550, which may be a real-time audio signal, a sub-octave bin amplitude signal, an audio envelope amplitude signal, a symbolic representation of a signal attack, decay, sustain, or release feature, or an arbitrary digital or analog signal from an external source.

Oscillator 510 may be implemented using hardware components including resistors, capacitors, and inductors, or it may be implemented in software and executed on a digital microprocessor.

Signal mixer unit 520 accepts a plurality of analog and/or digital input signals from oscillators 510 and/or input signals 550. The input signals are mixed, as will be understood by those skilled in the art, using mathematical functions including, but not limited to, addition and subtraction, multiplication and division, gating, delay, integration and differentiation, a sigmoid function (representing an audio signal compandor), a square root function, an exponential function, and dot and cross products.

A sound feature may include any of a set of acoustic properties of an audible signal serving as a basic unit of analysis by which sounds can be characterized and distinguished from one another. An impulsive sound feature may be any almost instantaneous, sharp sound feature, for example clapping hands or a drum.

In one example, an impulsive sound feature such as clapping hands is easily recognized by an observer's auditory cortex, which has a response time measured in tens of microseconds. However, the observer's visual cortex has a response time measured in tens of milliseconds, as evidenced by 24 frames-per-second movies being perceived as continuous motion. It is therefore advantageous to map the auditory-to-visual cortex signal processing by integrating the approximately instantaneous release of impulsive sounds to obtain an exponentially decreasing signal with a decay time measured in tens of milliseconds. This example shows a response time difference of approximately three orders of magnitude. The response time difference may vary, however, and a response time difference of one or more orders of magnitude may result.

In general, the visual cortex requires between 10 and 30 milliseconds to process visual stimuli, as evidenced by optical illusions such as the phi phenomenon (were a sequence of still images, when viewed in rapid succession, is perceived as continuous motion) and the beta movement (wherein flashing marquee lights appear to move). In an exemplary embodiment, the functions chosen for signal mixer unit 520 take advantage of these optical illusions.

Figure 6:
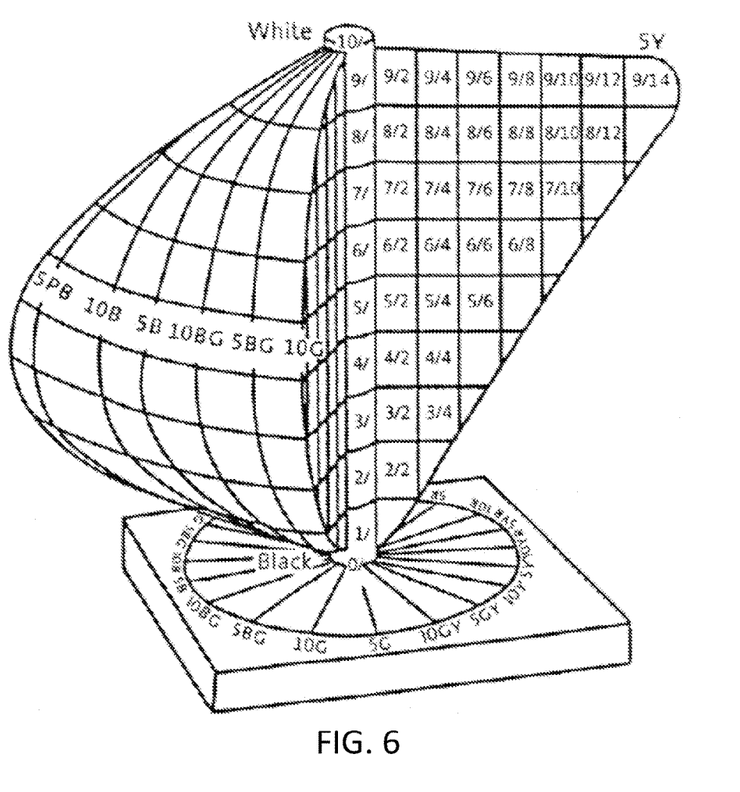
FIG. 6 illustrates the three-dimensional space of the Munsell color system.

Color space mapping unit 530 accepts an analog or digital input signal 525 from signal mixer 520 or an analog or digital input signal 515 from oscillator 510. This signal is then mapped to an output signal 540 that spans a path through a subset of the three-dimensional CIE (International Commission on Illumination) xyY color space that is delimited by the chromaticities and maximum spectral radiant intensities of the lighting display system channel. (FIG. 6 illustrates the three-dimensional color space of the Munsell color system.) The mapping may represent a linear or nonlinear path through the three-dimensional color space, spanning both chromaticity and intensity. Further, the linear mapping may be performed in a variety of color spaces, including CIE xyY, CIE uvY, CIE u'v'Y, HSV (Hue, Saturation and Value), and RGB (Red, Green, Blue).

In one embodiment, the path through the color space is correlated with the physical arrangement of a plurality of independently-controlled point or diffuse light sources in three-dimensional space. As an example, a frequency sweep by an oscillator 510 corresponds to motion both through the color space (that is, a change chromaticity and/or intensity) and through three-dimensional physical space. In another embodiment, random noise may be added to the mapping, particularly if the spatial distribution of light sources is essentially random.

For the purposes of the present invention, approximately 20 to 30 sub-octave bands spanning the audible spectrum are required to obtain a coherent mapping between the audio and visual signals (that is, what is heard and what is seen). In an exemplary embodiment, the frequency of the sub-octave bins is adapted to the detected frequency range of the audio signals. For example, speech typically spans the range of 300 Hz to 3500 Hz, while classical music typically spans a larger range, for example 30 Hz to 20 kHz. The frequency range of each sub-octave bin may also vary, either statically or dynamically, depending on psychoacoustic modeling to determine the optimum ranges under different ambient acoustic environments, and also based on whether the real-time audio is music or speech, and other classifications.

Figure 7:
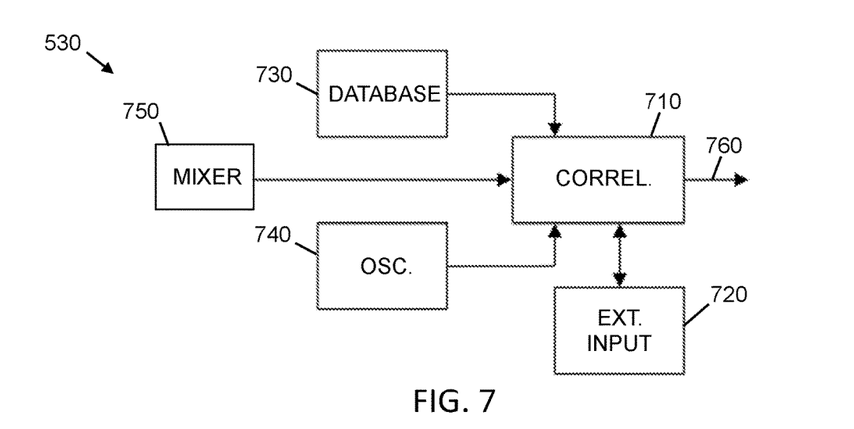
FIG. 7 illustrates a color space mapping unit, comprised of a temporal correlation unit and a database module.

Referring to FIG. 7, a color space mapping unit 530 is comprised a temporal correlation unit 710 that receives analog or digital input signals from one or a plurality of external input signals 720, which may be a real-time audio signal, a sub-octave bin amplitude signal, an audio envelope amplitude signal, a symbolic representation of a signal attack, decay, sustain, or release feature, or an arbitrary digital or analog signal from an external source. The temporal correlation unit is further in bidirectional communication with a database module 730 and one or a plurality of oscillators 740 and/or signal mixer units 750. and it outputs a signal 760 that spans a path through a subset of the three-dimensional CIE xyY color space that is delimited by the chromaticities and maximum spectral radiant intensities of the lighting display system channel.

The temporal correlation unit 710 may further modify the oscillator 740 frequency, amplitude, and/or waveform, and it may also modify the signal mixing unit 750 mathematical functions.

The temporal correlation unit 710 may also reference database 730 to classify the input signals, based for example on the music genre, key and/or and tempo, or speech styles from speaker pitch and cadence. These classifications may then be used to optimize database searches.

In one embodiment, the temporal correlation unit 710 is a neural network that compares the input signal 720 and the oscillator 740 and signal mixer 750 outputs with similar temporal sequences stored either explicitly or implicitly in the database module 730. Depending on the correlation between the input signals to temporal correlation unit 710 and the stored sequences in database module 730, the output signal 760 may be a mapping from the stored sequence rather than the input signals, or a linear or nonlinear combination thereof.

The neural network may further be a supervised neural network, wherein one or more members of an audience listening to the real-time audio and visually perceiving the visual lighting display may indicate their degree of approval with respect to the mapping via an external input signal 720. Examples of such input signals include, but are not limited to, a binary signal from a switch, a voice command, motion sensors, semantic analysis of an audio signal from a crowd of people, and semantic analysis of a video signal from one or a plurality of people. In a particular example, the video signal might be analyzed using face recognition to determine a person's emotional state.

In another embodiment, the temporal correlation unit is comprised of a genetic algorithm that generates a series of random color space mappings, with one or a plurality of audience members providing responses via external input signal 720 that together serve as a fitness function to train the temporal correlation unit in its response to real-time audio input signals. A swarm intelligence algorithm, and in general any suitable evolutionary algorithm, can also be used to perform a similar function to that of genetic algorithms.

In yet another embodiment, temporal correlation unit 710 is comprised of multiple interacting intelligent agents, wherein each agent applies a set of rules to generate temporal sequences for the color mappings, and which seek to maximize a cumulative reward defined by one or a plurality of audience members providing responses via external input signal 720. In a particular embodiment, the agent rules may be parametric, with rule parameters determined by, for example, the physical arrangement of the light sources.

The contents of database module 720 and/or the training parameters of temporal correlation unit 710 may further be archived and marketed as a "lighting-as-a-service" (LaaS) product for compatible audio-visual control systems.

Once temporal correlation unit 710 has been suitably trained, it is able to predict the listener's preferences and adapt its auditory-to-visual mapping accordingly for both music and speech. Even if listeners do not consciously experience the effects of chromesthesia, they will likely experience the effects subconsciously, and thereby gain a better and more satisfying multimedia experience.

Figure 8:
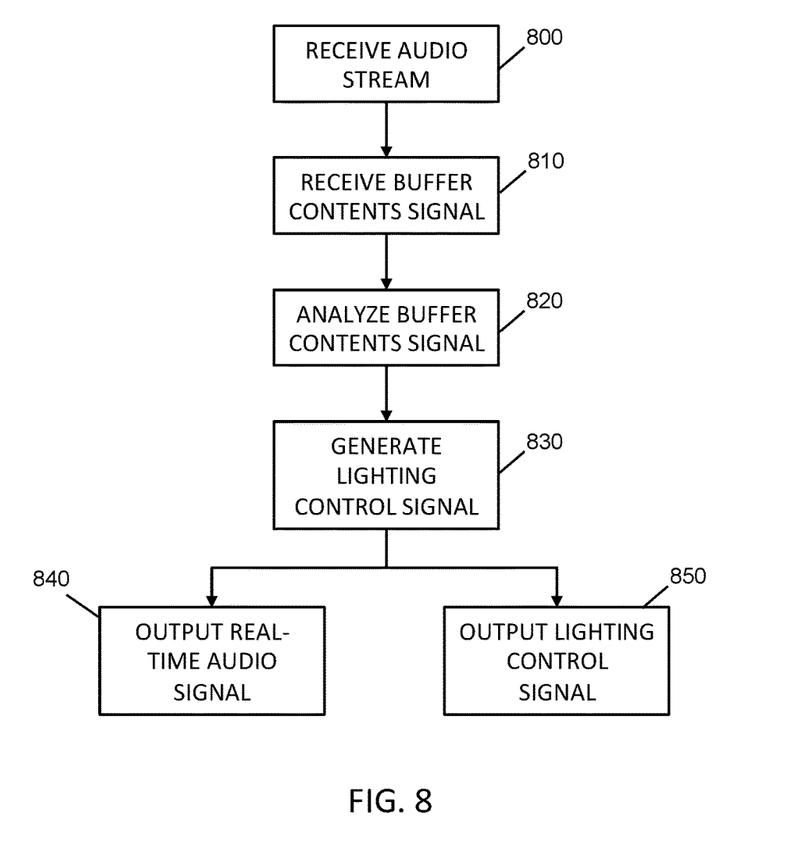
FIG. 8 is a flowchart of the main steps of a method carried out by the audio-visual controller.

Referring to FIG. 8, a flowchart of the main steps carried out by the audio-visual controller 110 is shown. In step 800, the audio-visual controller 110 receives, in a buffer, a streaming audio signal. In step 810, the predictive audio signal mapping unit 250 receives, from the buffer, a buffer contents signal, which is representative of the streaming audio signal that is present in the buffer. In step 820, the predictive audio signal mapping unit 250 analyzes the buffer contents signal. In step 830, the predictive audio signal mapping unit 250 generates a lighting control signal based on analysis of the buffer contents. Steps 840 and 850 occur simultaneously. In step 840, the buffer outputs a real-time audio signal to the playback system 130, and in step 850, the predictive audio signal mapping unit 250 outputs a lighting control signal in synchronization with, and corresponding to, the real-time audio signal.

Throughout the description, specific details have been set forth in order to provide a more thorough understanding of the invention. However, the invention may be practiced without these particulars. In other instances, well known elements have not been shown or described in detail and repetitions of steps and features have been omitted to avoid unnecessarily obscuring the invention. Accordingly, the specification and drawings are to be regarded in an illustrative, rather than a restrictive, sense.

The detailed description has been presented partly in terms of methods or processes, symbolic representations of operations, functionalities and features of the invention. These method descriptions and representations are the means used by those skilled in the art to most effectively convey the substance of their work to others skilled in the art. A software implemented method or process is here, and generally, understood to be a self-consistent sequence of steps leading to a desired result. These steps require physical manipulations of physical quantities. Often, but not necessarily, these quantities take the form of electrical or magnetic signals or values capable of being stored, transferred, combined, compared, and otherwise manipulated. It will be further appreciated that the line between hardware and software is not always sharp, it being understood by those skilled in the art that the software implemented processes described herein may be embodied in hardware, firmware, software, or any combination thereof. Such processes may be controlled by coded instructions such as microcode and/or by stored programming instructions in one or more tangible or non-transient media readable by a computer or processor. The code modules may be stored in any computer storage system or device, such as hard disk drives, optical drives, solid state memories, etc. The methods may alternatively be embodied partly or wholly in specialized computer hardware, such as ASIC or FPGA circuitry.

It will be clear to one having skill in the art that further variations to the specific details disclosed herein can be made, resulting in other embodiments that are within the scope of the invention disclosed. Steps in the flowchart may be performed in a different order, other steps may be added, or one or more may be removed without altering the main function of the system. Modules may be divided into constituent modules or combined into larger modules. All parameters and configurations described herein are examples only and actual values of such depend on the specific embodiment. Accordingly, the scope of the invention is to be construed in accordance with the substance defined by the following claims.

The invention claimed is:

1. A method for controlling one or more light sources, comprising:
receiving, in a buffer, a streaming audio signal;
receiving, from the buffer, a buffer contents signal representing at least a portion of the streaming audio signal in the buffer;
analyzing the buffer contents signal;
generating a lighting control signal based on said analysis;
outputting a real-time audio signal from the buffer; and
outputting the lighting control signal in synchronization with the real-time audio signal;
wherein:
the real-time audio signal comprises an impulsive sound feature having a first duration; and
said generating comprises generating a corresponding feature in the lighting control signal having a second duration that is longer than the first duration, thereby adapting a part of the lighting control signal corresponding to the impulsive sound feature to a human's visual response time.

2. The method of claim 1, wherein the second duration is three orders of magnitude longer than the first duration.

3. The method of claim 1, wherein said analysis determines whether the streaming audio signal includes an instance of a human voice.

4. The method of claim 1, wherein said analysis determines whether the streaming audio signal includes music.

5. The method of claim 1, further comprising storing pre-analyzed audio signals and their corresponding lighting control signals in a database, wherein the analyzing step comprises:
identifying, in the database, a match for said portion of the streaming audio signal;
retrieving, from the database, the corresponding lighting control signal for said match; and
basing the output lighting control signal on the retrieved corresponding lighting control signal.

6. The method of claim 1, further comprising:
storing previously analyzed audio signals and their corresponding lighting control signals in a database, in a format representing a light show; and
retrieving the stored signals to perform the light show.

7. The method of claim 1, wherein said analysis comprises:
detection and classification of music genre or music pattern based on one or more initial bars of a track in the streaming audio signal; and retrieval of a lighting control signal corresponding to the classification from a database.

8. The method of claim 1, further comprising:
analyzing an upcoming portion of a track, a whole track, or a playlist in the buffer contents signal;
planning a light show based on said upcoming portion of a track, a whole track, or a playlist; and
maintaining continuity of the light show between successive tracks, based on said upcoming portion of a track, a whole track, or a playlist.

9. The method of claim 1, further comprising:
analyzing a past portion of a track or whole track received in the buffer; and
maintaining continuity of a light show between successive tracks, based on said past portion of a track or whole track received in the buffer.

10. The method of claim 1, further comprising:
detecting a frequency range of the buffer contents signal; and
dividing the buffer contents signal into sub-octave bins spanning the frequency range;
wherein generating the lighting control signal is based on a content of each said bin.

11. The method of claim 1, wherein the lighting control signal includes a specification of color and a specification of brightness for at least one light source.

12. The method of claim 1, wherein the lighting control signal includes a specification of color and a specification of brightness for each of a plurality of light sources based on a physical location of each of the light sources.

13. The method of claim 1, wherein said lighting control signal is based on one or more of: frequency analysis; detection and classification of a percussive sound; detection of a melodic sound; strength of a melodic sound; a further received signal; a musical key; rhythmic dissonance; harmonic dissonance; tempo detection; beat detection; beat strength estimation; song transition; inter-song transition; a non-musical event; artificial intelligence; an interaction of multiple intelligent agents; an introduction of random colors; meta data of the streaming audio signal; an audience response; a sound envelope; maximizing a response of a lighting display system in relation to the real-time audio signal; varying a frequency range of a sub-octave bin used in said analysis; detection and classification of music genre or music pattern; detection and classification of speech style or pattern; a linear mapping of a sound feature in the streamed audio signal to the lighting control signal; and a non-linear mapping of a sound feature in the streamed audio signal to the lighting control signal.

14. A system for controlling one or more light sources, comprising:
a buffer configured to:
receive a streaming audio signal; and
output a real-time audio signal; and
a predictive mapping unit comprising a processor and a computer readable memory storing computer readable instructions which, when executed by the processor, cause the predictive mapping unit to:
receive, from the buffer, a buffer contents signal representing at least a portion of the streaming audio signal in the buffer;
analyze the buffer contents signal;
generate a lighting control signal based on said analysis; and
output the lighting control signal in synchronization with the real-time audio signal;
wherein:
the real-time audio signal comprises an impulsive sound feature having a first duration; and
said generating comprises generating a corresponding feature in the lighting control signal having a second duration that is longer than the first duration, thereby adapting a part of the lighting control signal corresponding to the impulsive sound feature to a human's visual response time.

15. The system of claim 14, wherein the predictive mapping unit further comprises:
a frequency analyzer, defined by the computer readable instructions, that receives the buffer contents signal and outputs a frequency domain signal; and
a binning module, defined by the computer readable instructions, that receives the frequency domain signal and outputs a plurality of sub-octave bin signals.

16. The system of claim 15, wherein the predictive mapping unit further comprises:
a temporal filter that outputs an envelope analysis signal;
a feature extractor, defined by the computer readable instructions, that is configured to detect one or more of genre; musical key; rhythmic dissonance; harmonic dissonance; tempo; beat; beat strength; song transition; inter-song transition; melody; melody strength; and percussive elements; and to output a corresponding feature signal; and
a non-music detector, defined by the computer readable instructions, configured to detect one or more of speech; a whistle; a yell; clapping; singing; wind; and rain; and
to output a non-musical event signal.

17. The system of claim 14, wherein the predictive mapping unit further comprises a color space mapper, defined by the computer readable instructions, configured to map the lighting control signal through a subset of color space that is delimited by chromaticities and maximum spectral radiant intensities of one or more light sources to which the lighting control signal is output.

* * * * *